(12) United States Patent
Tokatyan (10) Patent No.: US 10,112,585 B1
(45) Date of Patent: Oct. 30, 2018

(54) VEHICLE CLEANLINESS DETECTION SYSTEMS AND METHODS

(71) Applicant: Ford Global Technologies, LLC, Dearborn, MI (US)

(72) Inventor: Shant Tokatyan, Foster City, CA (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 15/628,300

(22) Filed: Jun. 20, 2017

(51) Int. Cl.
| | |
|---|---|
| *B60S 1/56* | (2006.01) |
| *G06T 7/00* | (2017.01) |
| *G02B 27/00* | (2006.01) |
| *G05D 1/00* | (2006.01) |
| *G05D 1/02* | (2006.01) |
| *G08G 1/0967* | (2006.01) |

(52) U.S. Cl.
CPC ............ *B60S 1/56* (2013.01); *G02B 27/0006* (2013.01); *G06T 7/97* (2017.01); *G05D 1/0088* (2013.01); *G05D 1/021* (2013.01); *G06T 2207/30248* (2013.01); *G08G 1/096725* (2013.01)

(58) Field of Classification Search
CPC ......... G06T 7/0004; G06T 7/001; G06T 7/10; G06T 7/13; G06T 7/97; G06T 2207/20224; G06T 2207/30248; G06T 2207/20252; G08G 1/096725; B60S 1/56; B60S 1/66; B60S 3/04
See application file for complete search history.

(56) References Cited

U.S. PATENT DOCUMENTS

| | | | |
|---|---|---|---|
| 2014/0270379 A1 | 9/2014 | Snider | B60R 1/00 |
| 2017/0293894 A1* | 10/2017 | Taliwal et al. | G06Q 10/20 |

FOREIGN PATENT DOCUMENTS

| | | | |
|---|---|---|---|
| CN | 103738308 A | 4/2014 | ............... B60S 3/04 |
| CN | 103909909 B | 1/2016 | ............... B60S 3/04 |
| DE | 19728725 A1 | 1/1999 | ............ G01M 17/00 |
| DE | 102013001332 A1 | 7/2014 | ............ G07C 11/00 |
| DE | 102014226358 A1 | 6/2016 | ............... B60S 1/00 |

* cited by examiner

*Primary Examiner* — Andrew W Johns
(74) *Attorney, Agent, or Firm* — David R. Stevens; Stevens Law Group (57) ABSTRACT

Example vehicle cleanliness detection systems and methods are described. In one implementation, a method positions a vehicle proximate an image capture station and receives multiple images from the image capture station. The multiple images include different views of the vehicle's exterior surfaces. A vehicle cleanliness detection system analyzes the multiple images to determine a cleanliness of the vehicle's exterior surfaces. Based on analyzing the cleanliness of the vehicle's exterior surfaces, the method determines whether the vehicle exterior needs to be cleaned.

20 Claims, 6 Drawing Sheets

VEHICLE CLEANLINESS DETECTION SYSTEMS AND METHODS

TECHNICAL FIELD

The present disclosure relates to vehicular systems and, more particularly, to systems and methods that detect the cleanliness of a vehicle.

BACKGROUND

Automobiles and other vehicles provide a significant portion of transportation for commercial, government, and private entities. Vehicles, such as autonomous vehicles, drive on roadways, parking lots, and other areas when transporting passengers or objects from one location to another. An example application of autonomous vehicles is operating as a taxi or shuttle service that picks up one or more passengers in response to a transportation request. When operating as a taxi or shuttle service, the autonomous vehicle drives to a pickup location such that a passenger requesting the service can enter the vehicle. The vehicle then drives to a destination and allows the passenger to exit the vehicle. Before picking up another passenger, it is preferable that the vehicle exterior is clean for the next passenger.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed herein may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure are directed to computer program products comprising such logic (e.g., in the form of software) stored on any computer useable medium. Such software, when executed in one or more data processing devices, causes a device to operate as described herein.

Figure 1:
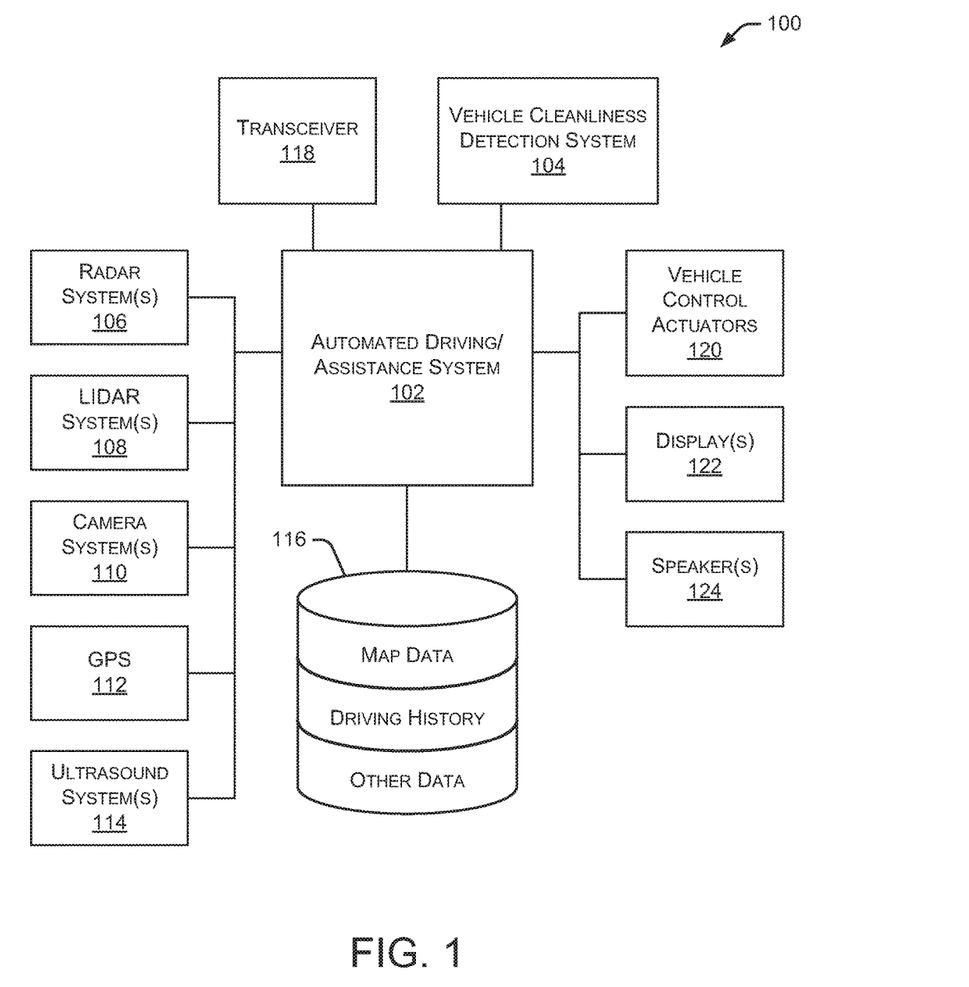
FIG. 1 is a block diagram illustrating an embodiment of a vehicle control system that includes a vehicle cleanliness detection system.

FIG. 1 is a block diagram illustrating an embodiment of a vehicle control system 100 within a vehicle that includes a vehicle cleanliness detection system 104. An automated driving/assistance system 102 may be used to automate or control operation of a vehicle or to provide assistance to a human driver. For example, the automated driving/assistance system 102 may control one or more of braking, steering, seat belt tension, acceleration, lights, alerts, driver notifications, radio, vehicle locks, or any other auxiliary systems of the vehicle. In another example, the automated driving/assistance system 102 may not be able to provide any control of the driving (e.g., steering, acceleration, or braking), but may provide notifications and alerts to assist a human driver in driving safely. Vehicle control system 100 includes vehicle cleanliness detection system 104 that interacts with various components in the vehicle control system, as well as external components and systems, to detects stains, dirt, trash, debris, and other items on the exterior of the vehicle. Vehicle cleanliness detection system 104 can detect any type of dirt or stain on the vehicle's exterior, such as bird droppings, mud, tar, spilled drinks, tree droppings, and the like. Although vehicle cleanliness detection system 104 is shown as a separate component in FIG. 1, in alternate embodiments, vehicle cleanliness detection system 104 may be incorporated into automated driving/assistance system 102 or any other vehicle component.

The vehicle control system 100 also includes one or more sensor systems/devices for detecting a presence of nearby objects (or obstacles) or determining a location of a parent vehicle (e.g., a vehicle that includes the vehicle control system 100). For example, the vehicle control system 100 may include one or more radar systems 106, one or more LIDAR systems 108, one or more camera systems 110, a global positioning system (GPS) 112, and/or ultrasound systems 114. The one or more camera systems 110 may include a rear-facing camera mounted to the vehicle (e.g., a rear portion of the vehicle), a front-facing camera, and a side-facing camera. Camera systems 110 may also include one or more interior cameras that capture images of passengers and other objects inside the vehicle. The vehicle control system 100 may include a data store 116 for storing relevant or useful data for navigation and safety, such as map data, driving history, or other data. The vehicle control system 100 may also include a transceiver 118 for wireless communication with a mobile or wireless network, other vehicles, infrastructure, or any other communication system.

The vehicle control system 100 may include vehicle control actuators 120 to control various aspects of the driving of the vehicle such as electric motors, switches or other actuators, to control braking, acceleration, steering, seat belt tension, door locks, or the like. The vehicle control system 100 may also include one or more displays 122, speakers 124, or other devices so that notifications to a human driver or passenger may be provided. A display 122 may include a heads-up display, dashboard display or indicator, a display screen, or any other visual indicator, which may be seen by a driver or passenger of a vehicle. The speakers 124 may include one or more speakers of a sound system of a vehicle or may include a speaker dedicated to driver or passenger notification.

It will be appreciated that the embodiment of FIG. 1 is given by way of example only. Other embodiments may include fewer or additional components without departing from the scope of the disclosure. Additionally, illustrated components may be combined or included within other components without limitation.

In one embodiment, the automated driving/assistance system 102 is configured to control driving or navigation of a parent vehicle. For example, the automated driving/assistance system 102 may control the vehicle control actuators 120 to drive a path on a road, parking lot, driveway or other location. For example, the automated driving/assistance system 102 may determine a path based on information or perception data provided by any of the components 106-118. A path may also be determined based on a route that maneuvers the vehicle to avoid or mitigate a potential collision with another vehicle or object. The sensor systems/devices 106-110 and 114 may be used to obtain real-time sensor data so that the automated driving/assistance system 102 can assist a driver or drive a vehicle in real-time.

Figure 2:
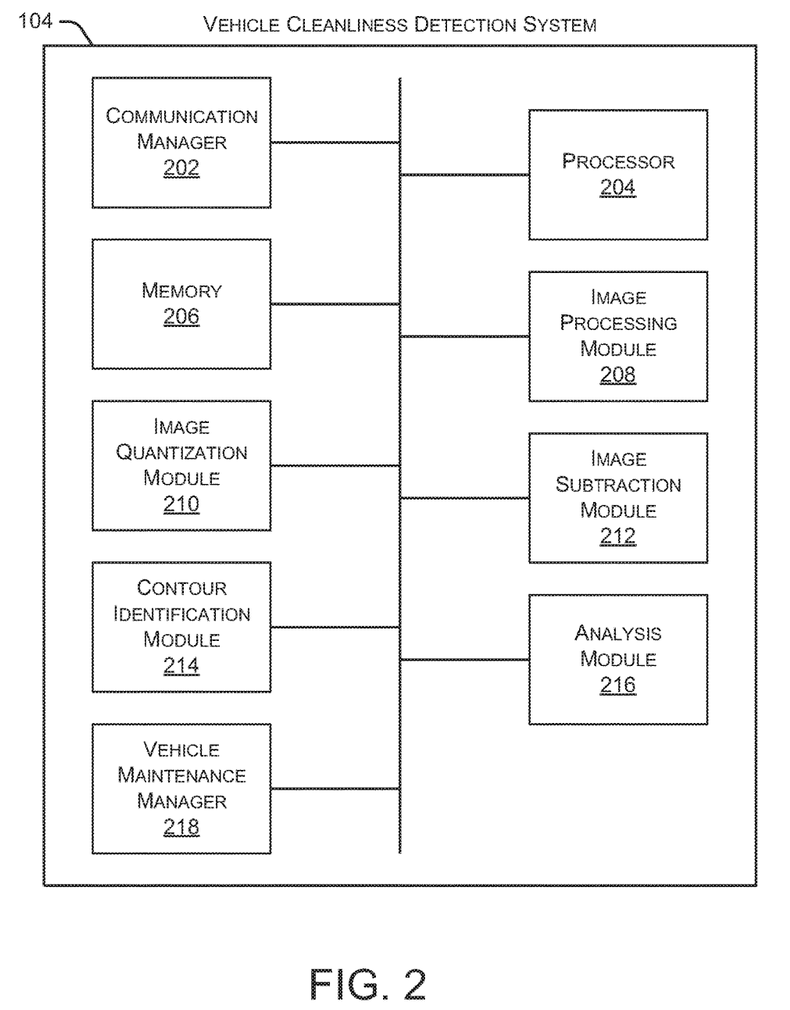
FIG. 2 is a block diagram illustrating an embodiment of a vehicle cleanliness detection system.

FIG. 2 is a block diagram illustrating an embodiment of vehicle cleanliness detection system 104. As shown in FIG. 2, vehicle cleanliness detection system 104 includes a communication manager 202, a processor 204, and a memory 206. Communication manager 202 allows vehicle cleanliness detection system 104 to communicate with other systems, such as automated driving/assistance system 102 and image capture stations, as discussed herein. Processor 204 executes various instructions to implement the functionality provided by vehicle cleanliness detection system 104, as discussed herein. Memory 206 stores these instructions as well as other data used by processor 204 and other modules and components contained in vehicle cleanliness detection system 104.

Additionally, vehicle cleanliness detection system 104 includes an image processing module 208 that receives image data from one or more camera systems 110 as well as one or more image capture stations (discussed herein). In some embodiments, image processing module 208 includes an image management algorithm or process that manages one or more clean images that represent images of the vehicle exterior when it is clean (e.g., no stains, dirt, trash, or other items on the exterior of the vehicle). Additionally, image processing module 208 may manage one or more additional images that are captured after a passenger has exited the vehicle. As discussed herein, these additional images are compared to the clean images to determine whether the vehicle exterior has a stain, trash, or other item as a result of the passenger traveling in the vehicle or as a result of the vehicle traveling to the previous passenger's destination.

In some embodiments, image processing module 208 receives multiple images from an image capture station that includes multiple cameras that capture images of different parts of the vehicle's exterior surfaces. As discussed herein, the image capture stations may be located in a variety of locations that are accessible to the vehicle.

In particular embodiments, image processing module 208 may perform various image transformation and image alignment procedures. For example, if a vehicle is parked adjacent to the image capture station at an angle (e.g., not oriented correctly within (or adjacent to) the image capture station), image processing module 208 can adjust the image so it appears to be at the same orientation or angle as a properly positioned vehicle. This image adjustment to resemble a properly positioned vehicle allows for more accurate comparison and analysis of clean vehicle images with current vehicle images to identify dirt, stains, and the like on the vehicle's exterior.

An image quantization module 210 is capable of quantizing both clean images and additional images to reduce noise in the images. When quantizing the images, the image quantization module 210 reduces the color spectrums of the images to three shades of gray, which helps to reduce noise in the images. In some embodiments, quantization is also referred to as "n-color gray scaling." For example, image quantization module 210 may implement the techniques disclosed in U.S. application Ser. No. 15/360,856, filed Nov. 23, 2016, and entitled "Detection of lane-splitting motorcycles", which is hereby incorporated herein in its entirety.

Vehicle cleanliness detection system 104 also includes an image subtraction module 212 that subtracts the additional images from the clean images to identify differences between the photos. These differences may represent stains, dirt, trash, or other items on the exterior of the vehicle. For example, image subtraction module 212 may implement the techniques disclosed in U.S. application Ser. No. 15/360, 856, filed Nov. 23, 2016, and entitled "Detection of lane-splitting motorcycles", which is hereby incorporated herein in its entirety.

A contour identification module 214 identifies one or more contours in the differences between the clean images and the additional images, as identified by image subtraction module 212. The contours include, for example, the outline of stains, dirt, or other items on the exterior of the vehicle. Contour identification module 214 also defines a bounding box around each contour. The bounding box allows a user or computing system to easily identify the identified contours. Additionally, based on the placement and angle of the camera that captured each image, vehicle cleanliness detection system 104 can map the bounding box to a particular location on the vehicle's exterior to assist, for example, with cleaning the vehicle.

An analysis module 216 detects locations and types of stains, dirt, and other items on the vehicle's exterior. For example, analysis module 216 analyzes the identified contours which indicate the presence of a new stain or other item. The new stain or item is classified by analyzing the shape of the contour as well as the smoothness of the contour edges. For example, if the contour is substantially round with smooth edges, it is likely a stain. Alternatively, if the contour has an irregular shape and/or sharp/jagged edges, it is more likely to be a piece of debris, trash or other item on the vehicle's exterior.

In some embodiments, analysis module 216 accesses a data source (e.g., a database or lookup table) containing information associated with previously classified contours, such as the shape and edge characteristics of each contour and the resulting classification of each contour. That information associated with previously classified contours may be used by analysis module 216 to analyze and classify future contours, such as identifying a previously classified contour in the data source that is a close match to a current contour being classified. A close match allows analysis module 216 to make assumptions regarding the classification of the contour (i.e., determine the type of stain, debris, or other item).

In some embodiments, analysis module 216 determines the overall cleanliness of the vehicle's exterior based on the types of stains/dirt identified, the size of the identified stains/dirt, the location of the identified stains/dirt, and the number of stains/dirt on the vehicle's exterior surfaces. This determination of the vehicle's overall exterior cleanliness is used to determine whether the exterior of the vehicle needs to be cleaned before accepting the next passenger. Also, different types of cleaning may be required depending on the severity of the stains/dirt on the vehicle. For example, a small amount of mud may be easily removed at an automated car wash or a mobile vehicle washing service. However, more severe stains such as bird droppings or certain types of tree droppings may require a more thorough cleaning at a service center or my a more experienced mobile vehicle cleaning service.

A vehicle maintenance manager 218 manages the cleaning and maintenance of the vehicle. For example, if a stain, dirt, trash, or other item is detected on the vehicle's exterior after a passenger has exited the vehicle, vehicle maintenance manager 218 may determine whether the vehicle needs to be removed from service before accepting the next passenger. If cleaning is required, vehicle maintenance manager 218 may instruct automated driving/assistance system 102 to drive the vehicle to an appropriate cleaning or service facility.

Figure 3A:
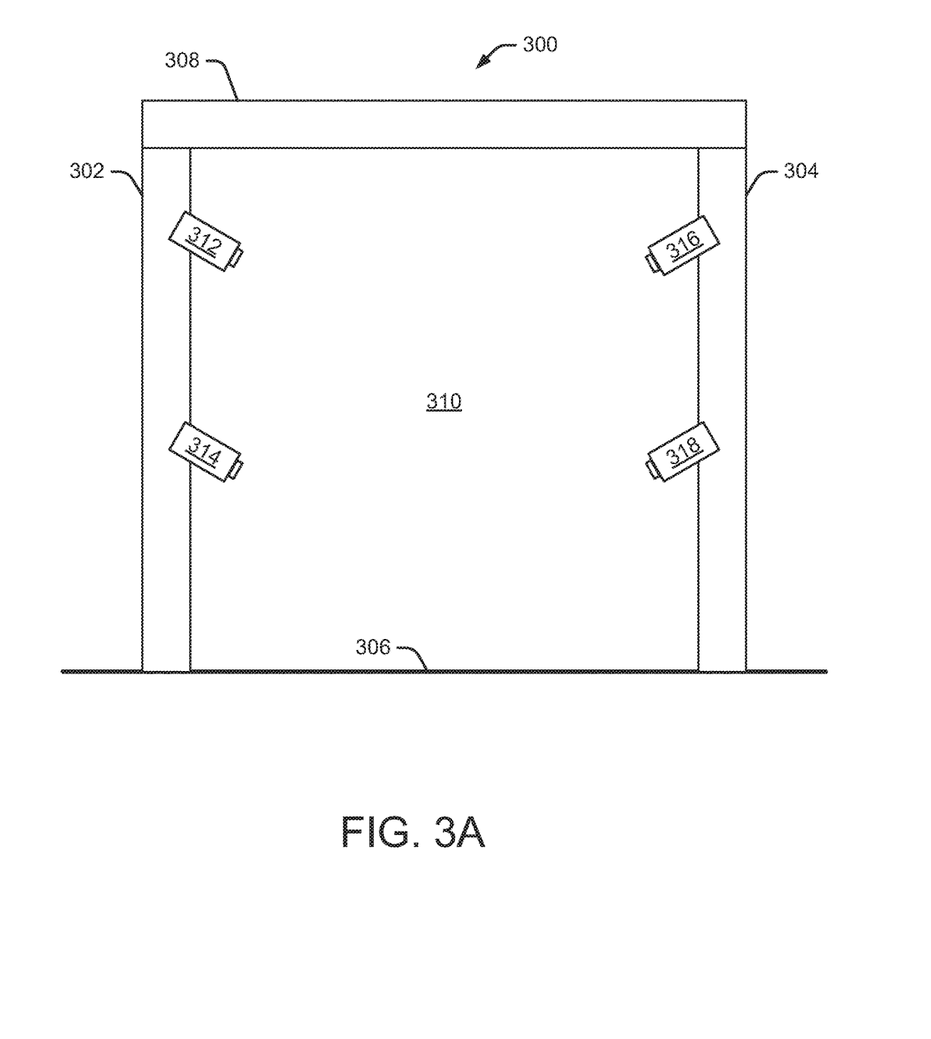
FIGS. 3A and 3B illustrate multiple views of an embodiment of an image capture station having multiple cameras.
Figure 3B:
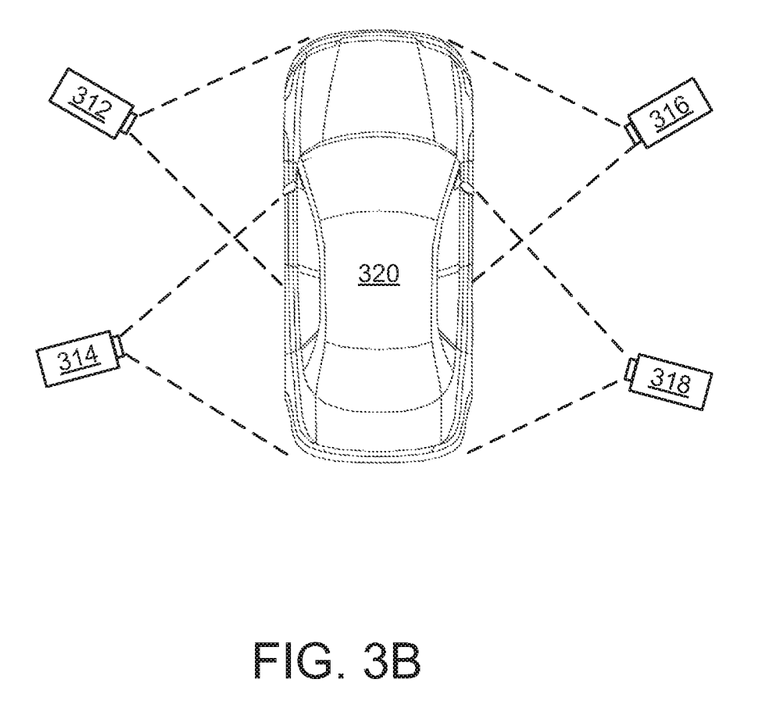

FIGS. 3A and 3B illustrate multiple views of an embodiment of an image capture station having multiple cameras. As shown in FIG. 3A, an image capture station 300 includes two vertical support structures 302 and 304 mounted to a base 306, which may be a floor, pavement, the ground, or any other supporting area on which to mount the vertical support structures. A horizontal support structure 308 is attached to the top of each of the two vertical support structures 302, 304. The combination of vertical support structures 302, 304 and horizontal support structure 308 form an opening 310 into which a vehicle may drive. In some embodiments, a vehicle may drive through opening 310 and proceed to exit by continuing to drive forward. In other embodiments, a vehicle drives into opening 310 and exits by reversing out of the opening.

Image capture station 300 includes multiple cameras 312, 314, 316, and 318 mounted to the vertical support structures 302, 304. Although four cameras 312-318 are shown in FIG. 3A, alternate embodiments may use any number of cameras mounted in a variety of locations and positioned to capture images in a variety of angles and directions. In some embodiments, one or more cameras may be mounted to horizontal support structure 308. Cameras 312-318 are positioned and oriented to capture images of a vehicle's exterior surfaces. In some embodiments, cameras 312-318 are positioned and oriented to capture images of substantially all exterior surfaces of the vehicle, except the underside (e.g., bottom) of the vehicle. By capturing images of substantially all exterior surfaces of the vehicle, vehicle cleanliness detection system 104 can analyze the cleanliness of all exterior vehicle surfaces. For example, cameras 312-318 may be positioned along the sides of the vehicle as well as above the vehicle. Additionally, multiple cameras 312-318 may be positioned near the front of the vehicle, the middle of the vehicle, and the rear of the vehicle.

Although not shown in FIG. 3A, image capture station 300 may include one or more computing systems and/or communication systems capable of capturing images of a vehicle using cameras 312-318 and communicating those images to a vehicle cleanliness detection system in the vehicle. Additionally, the one or more computing systems and/or communication systems may determine whether the vehicle is properly positioned within image capture station 300 prior to capturing images of the vehicle. In some embodiments, the one or more computing systems and/or communication systems may include one or more processors, one or more memory devices, one or more communication modules, one or more vehicle sensors, and the like.

Image capture station 300 may be implemented in a variety of configurations. In some embodiments, only vertical supports 302 and/or 304 are provided with no horizontal support 308. In other embodiments, the vertical supports may be existing posts or poles, such as street light poles, telephone poles, traffic sign posts, advertising sign posts, and the like. In some implementations, cameras 312-318 may be mounted to the side of a building or other structure capable of supporting the cameras. Thus, image capture station 300 can take many forms that allow a vehicle to drive near the image capture station such that the cameras associated with the image capture station can obtain images of the exterior of the vehicle and communicate those images to the vehicle cleanliness detection system in the vehicle. In some embodiments, at least a portion of image capture station 300 may be movable, such as a support structure on wheels or a camera mounted on a movable arm or other movable assembly.

Image capture station 300 can be positioned at any geographic location that provides convenient access to vehicles, such as autonomous vehicles. In some embodiments, image capture stations 300 are located at gas stations, electric vehicle charging stations, parking lots, vehicle service centers, autonomous vehicle staging/waiting areas, and the like. For example, after a passenger exits an autonomous vehicle, the vehicle may drive to the nearest image capture station 300 to determine whether the vehicle is clean enough to accept another passenger.

As shown in FIG. 3B, cameras 312-318 of image capture station 300 obtain images of different parts of the exterior surfaces of a vehicle 320. The broken lines in FIG. 3B show the approximate field of view of each camera 312-318. As shown, cameras 312-318 may have some overlapping areas, but the combined images from all cameras 312-318 capture substantially all exterior surfaces of vehicle 320. In alternate embodiments, any number of cameras in any number of different locations may be used to capture images of a particular vehicle's exterior surfaces.

Figure 4A:
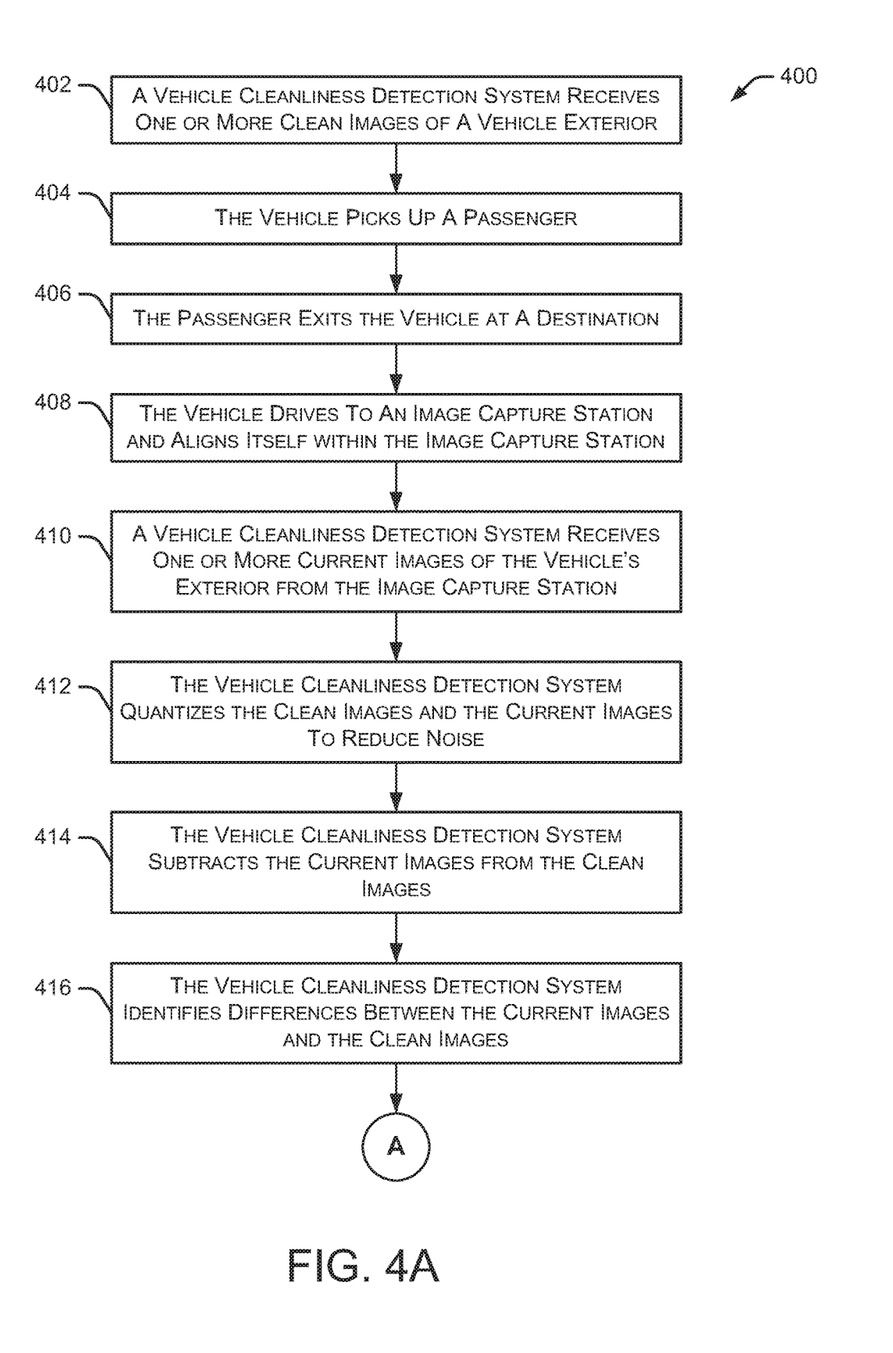
FIGS. 4A and 4B illustrate an embodiment of a method for detecting the cleanliness of an exterior of a vehicle.
Figure 4B:
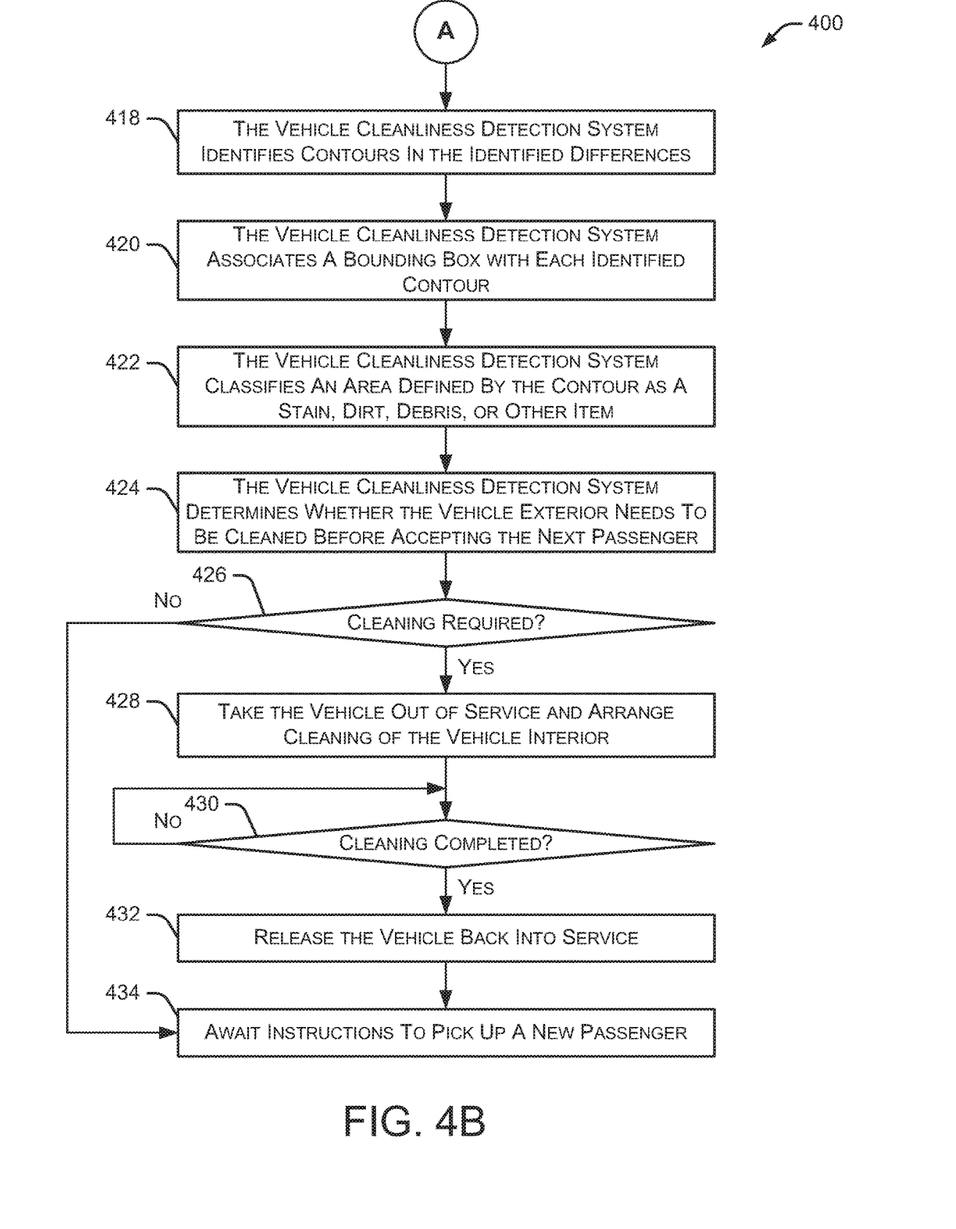

FIGS. 4A and 4B illustrate an embodiment of a method 400 for detecting the cleanliness of an exterior of a vehicle. Initially, a vehicle cleanliness detection system in a vehicle receives 402 one or more clean images of a vehicle exterior. These clean images may be considered "reference images" and represent a clean vehicle exterior. In some embodiments, the vehicle exterior should be substantially similar to the clean images before picking up a passenger for transport. In response to a transportation request (or other instruction), the vehicle picks up 404 a passenger and transports the passenger to a destination. The passenger exits 406 the vehicle at the destination.

After the passenger exits 406 the vehicle, the vehicle drives 408 to an image capture station and aligns itself within the image capture station. In some embodiments, there is a desired position for the vehicle within the image capture station to ensure that all captured images are relatively consistent with the clean images previously captured for the vehicle's exterior surfaces. The vehicle cleanliness detection system receives 410 one or more images of the current vehicle exterior (i.e., "current images") from the image capture station. As discussed herein, the image capture station includes any number of cameras that capture images of the vehicle's exterior. Those captured images are communicated (e.g., wirelessly) to the vehicle cleanliness detection system in the vehicle. In some embodiments, the location and position from which the current images are taken is substantially similar the location and position from which the clean images were taken.

Method 400 continues as the vehicle cleanliness detection system quantizes 412 the clean images and the current images to reduce noise. The vehicle cleanliness detection system then subtracts 414 the current images from the clean images (or subtracts the clean images from the current images). In some embodiments, the vehicle cleanliness detection system subtracts 414 each current image from a corresponding clean image (e.g., clean images of the same portion of the vehicle exterior).

The vehicle cleanliness detection system then identifies 416 differences between the current images and the clean images. As discussed herein, these differences may represent stains, dirt, debris, or other items on the exterior surface of the vehicle. The vehicle cleanliness detection system identifies 418 contours in the identified differences. The contours may represent, for example, the outline of stains, dirt, debris, or other items.

As method 400 continues, the vehicle cleanliness detection system associates 420 a bounding box with each identified contour. As noted above, the bounding box allows a user or computing system to easily identify the identified contours. And, based on the placement and angle of the camera that captured each image, the vehicle cleanliness detection system can map the bounding box to a particular location on the exterior of the vehicle. Thus, the bounding box can assist cleaning personnel or self-cleaning systems in locating the specific stains, dirt, debris, or other items.

The vehicle cleanliness detection system classifies 422 an area defined by the contour as a stain, dirt, debris, or other item. As discussed herein, the area defined by a contour can be classified by analyzing the shape of the contour as well as the smoothness of the contour edges. For example, if the contour is substantially round with smooth edges, it is likely a stain. However, if the contour has an irregular shape and/or has sharp/jagged edges, it is more likely to be debris or another item on the exterior surface of the vehicle. As noted above, in some embodiments, analysis module 216 may access a data source containing information associated with previously classified contours. This additional information is useful to analyze and classify contours, such as identifying a previously classified contour in the data source that is a close match to a current contour being classified.

The vehicle cleanliness detection system determines 424 whether the vehicle exterior needs to be cleaned before accepting the next passenger. For example, if the vehicle cleanliness detection system identifies a significant stain or dirt on an exterior surface of the vehicle, the vehicle may need to be cleaned before accepting another passenger. Additionally, if the vehicle needs to be cleaned, the determination 424 may include the type of cleaning needed. For example, a small stain or a small amount of mud can be easily removed by a robot, an automated cleaning system, or an individual user located near the vehicle. However, if a significant stain or dirt that is difficult to remove is identified, the vehicle may require a more thorough cleaning at a vehicle service center or performed by a more sophisticated mobile cleaning service. If cleaning is not required at 426, the vehicle awaits instructions 434 to pick up a new passenger in response to a new transportation request.

If cleaning is required 426, the vehicle may be taken out of service 428 while a cleaning service is arranged and the vehicle exterior is cleaned. When the vehicle cleaning is completed 430, the vehicle is released back into service 432 and is available to accept new transportation requests. The vehicle then awaits instructions 434 to pick up a new passenger in response to a new transportation request.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. A method comprising:
   positioning a vehicle proximate an image capture station;
   receiving a plurality of images from the image capture station, wherein the plurality of images include different views of the vehicle's exterior surfaces;
   analyzing, by a vehicle cleanliness detection system, the plurality of images to determine a cleanliness of the vehicle's exterior surfaces; and
   determining, based on analyzing the cleanliness of the vehicle's exterior surfaces, whether the vehicle exterior needs to be cleaned.

2. The method of claim 1, further comprising comparing the received plurality of images to a corresponding plurality of clean images of the vehicle's exterior to identify differences.

3. The method of claim 2 further comprising identifying differences between the received plurality of images and the corresponding plurality of clean images.

4. The method of claim 2, further comprising quantizing the received plurality of images and the corresponding plurality of clean images to reduce noise.

5. The method of claim 2, further comprising identifying at least one contour associated with the identified differences.

6. The method of claim 5, further comprising classifying an area defined by the contour, wherein the classifying includes determining a shape of the contour.

7. The method of claim 5, further comprising classifying an area defined by the contour, wherein the classifying includes determining a smoothness of edges of the contour.

8. The method of claim 1, further comprising taking the vehicle out of service responsive to determining that the vehicle exterior needs to be cleaned.

9. The method of claim 1, wherein the plurality of images are received from a plurality of cameras associated with the image capture station.

10. The method of claim 1, wherein the vehicle cleanliness detection system is located within the vehicle.

11. The method of claim 1, wherein determining whether the vehicle exterior needs to be cleaned includes determining a type of cleaning service needed to clean the vehicle exterior.

12. The method of claim 1, wherein the vehicle is an autonomous vehicle.

13. A method comprising:
   positioning a vehicle proximate an image capture station, wherein the image capture station includes a plurality of cameras capable of capturing a plurality of images of the vehicle's exterior surfaces, and wherein the plurality of images include different views of the vehicle's exterior surfaces;
   receiving the plurality of images of the vehicle's exterior surfaces from the image capture station;
   analyzing, by a vehicle cleanliness detection system in the vehicle, the plurality of images to determine a cleanliness of the vehicle's exterior surfaces; and
   determining, based on analyzing the cleanliness of the vehicle's exterior surfaces, whether the vehicle exterior needs to be cleaned.

14. The method of claim 13, wherein analyzing the plurality of images to determine a cleanliness of the vehicle's exterior surfaces includes:
   comparing the plurality of received images to a corresponding plurality of clean images of the vehicle's exterior surfaces; and
   identifying differences between the plurality of received images and the corresponding plurality of clean images.

15. The method of claim 14, further comprising:
   identifying at least one contour associated with the identified differences between the plurality of received images and the corresponding plurality of clean images; and
   classifying an area defined by the contour, wherein the classifying includes at least one of determining a shape of the contour and determining a smoothness of edges of the contour.

16. An apparatus comprising:
   a communication manager in a vehicle configured to receive a plurality of images from an image capture station, wherein the plurality of images are captured by a plurality of cameras associated with the image capture station, and wherein the plurality of images include different views of the vehicle's exterior surfaces;
   an image processing module configured to analyze the plurality of received images to determine a cleanliness of the vehicle's exterior surfaces; and
   a vehicle maintenance manager configured to determine, based on the cleanliness of the vehicle's exterior surfaces, whether the vehicle exterior needs to be cleaned.

17. The apparatus of claim 16, further comprising an image subtraction module configured to:
  compare the plurality of received images to a corresponding plurality of clean images of the vehicle's exterior surfaces; and
  identify differences between the plurality of received images and the corresponding plurality of clean images.

18. The apparatus of claim 17, further comprising a contour identification module configured to identify at least one contour associated with the identified differences between the plurality of received images and the corresponding plurality of clean images.

19. The apparatus of claim 16, further comprising an image quantization module configured to quantize the received plurality of images to reduce noise.

20. The apparatus of claim 16, wherein the apparatus is coupled to an automated driving system in the vehicle.

* * * * *